(12) United States Patent
Mao et al.

(10) Patent No.: US 12,062,918 B2
(45) Date of Patent: *Aug. 13, 2024

(54) POWER SYSTEMS WITH INVERTER INPUT VOLTAGE CONTROL

(71) Applicant: Huawei Digital Power Technologies Co., Ltd., Shenzhen (CN)

(72) Inventors: Xiaolin Mao, Addison, TX (US); Heping Dai, Addison, TX (US); Huibin Zhu, Addison, TX (US); Dianbo Fu, Frisco, TX (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 21 days.

This patent is subject to a terminal disclaimer.

(21) Appl. No.: 17/880,497

(22) Filed: Aug. 3, 2022

(65) Prior Publication Data

US 2022/0376513 A1    Nov. 24, 2022

Related U.S. Application Data

(63) Continuation of application No. 16/741,259, filed on Jan. 13, 2020, now Pat. No. 11,437,823, which is a
(Continued)

(51) Int. Cl.
*H02J 3/38*    (2006.01)
*H02J 7/02*    (2016.01)
(Continued)

(52) U.S. Cl.
CPC .............. *H02J 3/381* (2013.01); *H02J 3/38* (2013.01); *H02J 3/388* (2020.01); *H02J 7/02* (2013.01);
(Continued)

(58) Field of Classification Search
None
See application file for complete search history.

(56) References Cited

U.S. PATENT DOCUMENTS 7,602,080 B1   10/2009  Hadar et al.
7,796,410 B2 *  9/2010  Takayanagi ............. B60L 1/003
                                                           307/66
(Continued)

FOREIGN PATENT DOCUMENTS

CN    201234142    5/2009
CN    102055363    5/2011
(Continued)

OTHER PUBLICATIONS

International Search Report dated Aug. 22, 2018 in PCT Application No. PCT/CN2018/086663, 9 pages.
(Continued)

*Primary Examiner* — Jared Fureman
*Assistant Examiner* — Aqeel H Bukhari
(74) *Attorney, Agent, or Firm* — Vierra Magen Marcus LLP

(57) ABSTRACT

A direct current (DC) bus voltage from a combined output of a plurality of DC power modules is controlled based on an alternating current (AC) voltage of a power grid. The DC bus voltage tracks the AC grid voltage to provide efficient conversion between the DC power sources and the AC grid, even when the amplitude of the AC grid voltage varies. In one example, a variable reference voltage is generated based on a detected AC grid voltage. The reference voltage increases and decreases in proportion to increases and decreases in the AC grid voltage. In this manner, large differences between the bus voltage and the grid voltage are avoided. By closely tracking the two voltages, efficiency in the modulation index for power conversion can be achieved.

19 Claims, 13 Drawing Sheets

Related U.S. Application Data continuation of application No. 15/594,231, filed on May 12, 2017, now Pat. No. 10,536,002.

(51) Int. Cl.
   *H02J 13/00* (2006.01)
   *H02J 1/10* (2006.01)

(52) U.S. Cl.
   CPC .. *H02J 13/00002* (2020.01); *H02J 13/00022* (2020.01); *H02J 1/10* (2013.01); *H02J 13/00* (2013.01); *H02J 13/00024* (2020.01); *H02J 2300/24* (2020.01)

(56) References Cited

U.S. PATENT DOCUMENTS

| | | | |
|---|---|---|---|
| 8,102,074 B2 | 1/2012 | Hadar et al. | |
| 8,183,852 B2 | 5/2012 | Fornage | |
| 8,587,151 B2 | 11/2013 | Adest et al. | |
| 9,413,268 B2 | 8/2016 | Fu et al. | |
| 9,425,622 B2 | 8/2016 | Deboy et al. | |
| 9,941,738 B2 * | 4/2018 | Beg | H02J 7/0068 |
| 11,437,823 B2 * | 9/2022 | Mao | H02J 7/02 |
| 2010/0085035 A1 | 4/2010 | Fornage | |
| 2010/0133904 A1 * | 6/2010 | Klodowski | H02J 3/50 307/24 |
| 2013/0026756 A1 | 1/2013 | Andresen et al. | |
| 2013/0307339 A1 | 11/2013 | Subramanium et al. | |
| 2014/0029308 A1 | 1/2014 | Cojocaru et al. | |
| 2014/0327408 A1 * | 11/2014 | Ishii | B60L 50/51 320/135 |
| 2015/0372490 A1 | 12/2015 | Bakas et al. | |
| 2016/0268917 A1 * | 9/2016 | Ramsay | H02M 7/53871 |
| 2018/0131321 A1 | 5/2018 | Xu et al. | |
| 2018/0375336 A1 * | 12/2018 | Bhowmik | H02M 1/12 |

FOREIGN PATENT DOCUMENTS

| | | |
|---|---|---|
| CN | 102185513 | 9/2011 |
| CN | 103094922 | 5/2013 |
| CN | 103401269 | 11/2013 |
| CN | 105144530 | 12/2015 |
| CN | 105917569 | 8/2016 |
| CN | 106026172 | 10/2016 |
| CN | 106300433 | 1/2017 |
| WO | 2015029597 | 3/2015 |

OTHER PUBLICATIONS

Non-Final Office Action dated Apr. 17, 2019, U.S. Appl. No. 15/594,231.
Response to Non-Final Office Action dated Aug. 19, 2019, U.S. Appl. No. 15/594,231.
Notice of Allowance dated Sep. 5, 2019, U.S. Appl. No. 15/594,231.
EP 18797622.0-1202—Extended European Search Report dated Mar. 19, 2020, 8 pages.
Office Action dated Sep. 3, 2020, Chinese Patent Application No. 201880025493.0.
Yang Renzeng et al., "Single-Stage Grid-Connected PV Inverter with Nonlinear Controller", Transactions of China Electrotechnical Society, vol. 28 No. 8, Aug. 2013, with an English abstract, 8 pages.
Yan Deng et al., "An Isolated High-Frequency DC-AC Converter Based on Differential Structure With Ultralow Distortion Output Voltage", IEEE Transactions on Industrial Electronics, vol. 62, Issue: 12, Dec. 2015, 12 pages.
Notice of Allowance dated Apr. 19, 2021, Chinese Patent Application No. 201880025493.0.
Non-Final Office Action dated Nov. 15, 2021, U.S. Appl. No. 16/741,259.
Response to Non-Final Office Action dated Mar. 22, 2022, U.S. Appl. No. 16/741,259.
Notice of Allowance dated May 4, 2022, U.S. Appl. No. 16/741,259.
Corrected Notice of Allowability dated May 20, 2022, U.S. Appl. No. 16/741,259.

* cited by examiner

POWER SYSTEMS WITH INVERTER INPUT VOLTAGE CONTROL

PRIORITY CLAIM

This application is a continuation of U.S. patent application Ser. No. 16/741,259 filed Jan. 13, 2020 by Mao et al., entitled "POWER SYSTEMS WITH INVERTER INPUT VOLTAGE CONTROL," which is a continuation of U.S. patent application Ser. No. 15/594,231 filed May 12, 2017 by Mao et al., entitled "POWER SYSTEMS WITH INVERTER INPUT VOLTAGE CONTROL," both of which are incorporated by reference herein in its entirety.

BACKGROUND OF THE INVENTION

Modern power systems may include many types of differing power sources. For example, direct current (DC) power systems are commonly integrated into traditional alternating current (AC) power grids to provide supplemental power to or otherwise interface with the power grid. These systems may exist in large-scale implementations by commercial power providers or small-scale implementations by businesses and residential users.

Solar panels are a common type of power source that generates direct current (DC) voltages, although other types of DC power sources such as electrochemical power sources also exist. Typically, the DC voltage and DC current from one solar panel is well below the needs of the voltage and current needed for the Alternating Current (AC) power grid. Typically, many solar panels are used in combination to provide the necessary voltage and current for the AC power grid. The DC voltages/currents also need to be converted to AC voltages/currents. A significant challenge is to efficiently transfer the DC power from each solar panel to the AC power grid. Note that this problem is not limited to converting from DC power to AC power. Even if the solar panels (or other DC power sources) were to be combined to provide DC power, there are challenges in efficiently "combining" the DC power. A significant factor in this challenge is that the power/voltage/current output of a solar panel is not fixed.

SUMMARY

According to one aspect of the present disclosure, there is provided an apparatus that includes a plurality of direct current (DC) power modules including at least a first power module having a first output and a second power module having a second output; a bus connecting the plurality of DC power modules, the bus connecting the first output and the second output in series; an inverter having a direct current (DC) terminal and an alternating current (AC) terminal; and a management circuit configured to determine an AC voltage at the AC terminal and control a direct current (DC) voltage at the DC terminal based on the AC voltage.

Optionally, in any of the preceding aspects, the management circuit is configured to generate a DC reference voltage based on the AC voltage; and the management circuit is configured to control the DC voltage based on the DC reference voltage.

Optionally, in any of the preceding aspects, the management circuit is configured to control the DC input voltage by varying an amount of current provided to the AC output based on the AC output voltage.

Optionally, in any of the preceding aspects, the management circuit is configured to provide the DC voltage at a first voltage level in response to a first magnitude of the AC voltage and to provide the DC voltage at a second voltage level in response to a second magnitude of the AC voltage; the first voltage level of the DC voltage is higher than the second voltage level of the DC voltage; and the first magnitude of the AC voltage is higher than the second magnitude of the AC voltage.

Optionally, in any of the preceding aspects, the DC voltage is a combined output voltage of the plurality of DC power modules, the combined output voltage corresponding to a sum of individual output voltages of the plurality of DC power modules.

Optionally, in any of the preceding aspects, the management circuit is configured to detect the first magnitude and the second magnitude of the AC voltage at the AC terminal.

Optionally, in any of the preceding aspects, the management circuit includes a controller coupled to the bus; the controller is configured to generate reference voltage at a first reference level by filtering based on the first magnitude of the AC voltage and a second level by filtering based on the second magnitude of the AC voltage; and the controller is configured to determine a first amount of reference current based on combining the first reference level and the first voltage level and is configured to determine a second amount of reference current based on combining the second reference level and the second voltage level.

Optionally, in any of the preceding aspects, the DC terminal of the inverter is connected to the bus and is configured to receive the DC voltage; and the AC terminal of the inverter is connected to a power grid that provides the AC voltage.

Optionally, in any of the preceding aspects, each DC power module comprises a DC power source coupled to a DC power converter having an output, the outputs of the DC power converters being coupled in series.

Optionally, in any of the preceding aspects, the plurality of power modules is a plurality of photovoltaic power modules, each power module of the plurality having a plurality of photovoltaic cells.

Optionally, in any of the preceding aspects, the plurality of power modules is a plurality of electrochemical power storage modules, each power module of the plurality having a plurality of electrochemical cells.

According to one aspect of the present disclosure, there is provided a computer-implemented method, comprising: receiving at a direct current (DC) terminal a combined output voltage of a plurality of DC power modules connected in series; generating at an alternating current (AC) terminal an alternating current for a power grid, the alternating current is generated based on the combined output voltage of the DC power modules; detecting at the AC terminal an AC voltage of the power grid having a variable amplitude; and generating a variable reference voltage to control a level of the combined output voltage based on the variable amplitude of the AC voltage.

Optionally, in any of the preceding aspects, generating a variable reference voltage comprises: generating the variable reference voltage at a first reference level based on a first amplitude of the AC voltage; and generating the variable reference voltage at a second reference level based on a second amplitude of the AC voltage; wherein the first amplitude is greater than the second amplitude; and wherein the first reference level of the variable reference voltage is higher than the second reference level of the variable reference voltage.

Optionally, in any of the preceding aspects, the method further comprises generating the combined output voltage at a first voltage level in response to the first reference level of the variable reference voltage; and generating the combined output voltage at a second voltage level in response to the second reference level of the variable reference voltage; wherein the first voltage level of the combined output voltage is greater than the second voltage level of the combined output voltage.

Optionally, in any of the preceding aspects, the method further comprises generating a variable reference for an output current exported to the AC output based on the variable amplitude of the AC voltage.

Optionally, in any of the preceding aspects, the combined output voltage of the plurality of power modules is a sum of individual DC output voltages of the plurality of power modules.

Optionally, in any of the preceding aspects, the plurality of power modules is a plurality of photovoltaic power modules; and each power module includes a power optimizer and a photovoltaic panel having a plurality of photovoltaic cells.

Optionally, in any of the preceding aspects, the power optimizer of each power module includes a DC power converter.

Optionally, in any of the preceding aspects, the variable amplitude is a variable peak amplitude of the AC voltage.

According to one aspect of the present disclosure, there is provided a non-transitory computer-readable medium storing computer instructions for controlling a direct current (DC) source, that when executed by one or more processors, cause the one or more processors to perform the steps of: detect an alternating current (AC) voltage at an AC terminal of an inverter coupled to a power grid; determine for a bus connected to a DC terminal of the inverter a reference voltage based on the AC voltage at the AC terminal, the bus connecting outputs of a plurality of DC power modules in series; and generate one or more indications of the reference voltage in order to provide a bus voltage at a voltage level based on a magnitude of the AC voltage at the AC terminal of the inverter.

Optionally, in any of the preceding aspects, the step of detect an AC voltage comprises detecting a first magnitude of the AC voltage and a second magnitude of the AC voltage at the AC terminal of the inverter; the step of determine a reference voltage comprises determining a first reference level for the reference voltage and a second reference level for the reference voltage based on the first magnitude of the AC voltage and the second magnitude of the AC voltage; and the step of generate one or more indications of the reference voltage comprises generating a first indication of the first reference level of the reference voltage to provide the bus voltage at a first DC voltage level and generating a second indication of the second reference level of the reference voltage to provide the bus voltage at a second DC voltage level.

Optionally, in any of the preceding aspects, generating one or more indications of the DC reference voltage comprises: generating the reference voltage at the first reference level; and generating the reference voltage at the second reference level.

Optionally, in any of the preceding aspects, wherein the steps include the steps of: generate a first amount of reference current based on the indication of the first reference level of the reference voltage; generate a second amount of reference current based on the indication of the second reference level of the reference voltage; and generate the bus voltage at the first DC voltage level by providing to the power grid a first amount of AC output current based on the first amount of reference current and generating the bus voltage at the second DC voltage level by providing to the power grid a second amount of AC output current based on the second amount of the reference current; wherein the first reference level of the reference voltage is higher than the second reference level of the reference voltage; and wherein the first amount of AC output current is greater than the second amount of AC output current.

According to one aspect of the present disclosure, there is provided an apparatus, comprising: means for receiving at a direct current (DC) terminal a combined output voltage of a plurality of DC power modules connected in series; means for generating at an alternating current (AC) terminal an alternating current for a power grid, the alternating current is generated based on the combined output voltage of the DC power modules; means for detecting at the AC terminal an AC voltage of the power grid having a variable amplitude; and means for generating a variable reference voltage to control a level of the combined output voltage based on the variable amplitude of the AC voltage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
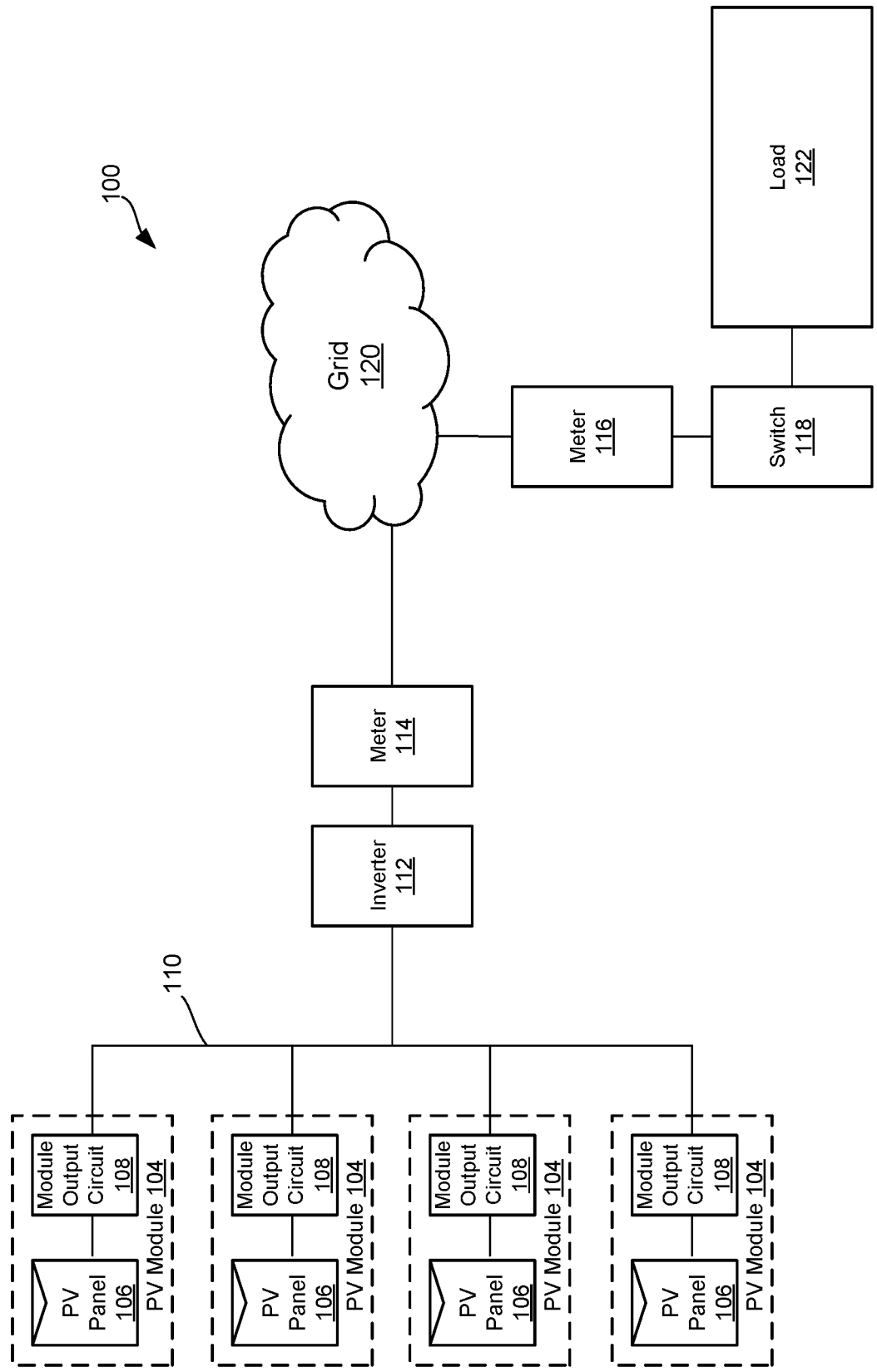
FIG. 1 is a block diagram depicting an example of a power system that includes a plurality of power modules.

The disclosure relates to technology for power system control, such as controlling the delivery of power, voltage, and/or current from a combination of direct current (DC) power sources. For example, the technology may be used in the control of DC sources such as photovoltaic (e.g., solar) cells, electrochemical cells, and DC batteries. In one embodiment, the technology may be used in the conversion of power from direct current (DC) power sources to an alternating current (AC) power requirement of a power grid or other load. For example, the disclosed technology provides for the control of a DC input voltage based on a magnitude of an AC output voltage of an inverter.

In one embodiment, a system includes multiple power modules that individually generate DC electrical outputs, which are connected in series by a bus (also referred to as a "string bus"). In this arrangement, the output voltage of the bus is the sum of individual output voltages of the power modules connected by the bus. Such buses may be used in photovoltaic systems to combine outputs of multiple photovoltaic modules to achieve a desired output voltage that is provided to an inverter. The inverter then converts this DC input from the bus into an AC output. The voltage provided to an inverter may be maintained within an acceptable range to provide an adequate level of inverter efficiency. For example, a bus may provide electrical power to an inverter in a range of 200-500 volts in some situations. Inverter input voltage may be maintained at some higher voltage than the output voltage for efficient inverter operation so that, to produce a 230 volt AC output from an inverter (i.e. 230 volts root mean square voltage, or 325 volts peak-to-peak), it may be efficient to maintain DC input in a range of about 390 volts (e.g. 380-400 volts, or 350-440 volts).

Photovoltaic modules may generate a current and voltage that depend primarily on the intensity and wavelengths of sunlight which is not constant (e.g., time of day, time of year, temperature, cloud cover, and other factors may affect photovoltaic module output). As a result, photovoltaic modules may generate a varying amount of power and may provide outputs that vary in DC voltage and/or current. Maintaining efficiency when combining outputs from such variable power sources is challenging. For example, maintaining an output voltage from a bus to an inverter within a certain range (e.g. within safety limits and/or efficient operating range of inverter) may be challenging when the output voltage from the bus is the sum of individual photovoltaic module outputs that fluctuate in sometimes unpredictable ways. For power modules other than photovoltaic modules, other factors may cause fluctuation and may make control challenging.

In addition to variances in the outputs of power modules, the voltage of a power grid or other load connected to a group of power modules may vary. For example, some power grids can be expected to fluctuate or have a voltage variance of about 10%. Such variances in the voltage of the power grid coupled to a DC power system presents challenges in efficiently converting between DC power sources and an AC power grid. For example, variances may lead to decreases in the modulation index of the power conversion, which represents the ratio of the AC voltage peak to the DC bus voltage.

In one embodiment, a DC terminal of an inverter coupled to a bus is controlled based on an AC terminal of the inverter connected to a power grid or load. The DC terminal is controlled to track the AC terminal to provide efficient conversion between the DC power sources and the AC power grid, even when the amplitude of the AC grid voltage varies. In one example, a variable reference voltage is generated based on a detected AC voltage at the AC terminal which corresponds to the grid voltage. The detected AC voltage is the voltage of the load or power grid connected to the power sources via the inverter. The reference voltage increases and decreases in proportion to increases and decreases in the AC terminal voltage in one embodiment. In this manner, large differences between the bus voltage and the grid voltage are avoided. By closely tracking the two voltages, a high modulation index for power conversion can be achieved, which results in high efficiency.

FIG. 1 is a block diagram depicting an example of a power system 100 that includes a plurality of power modules 104. In this example, each power module is a photovoltaic module 104. Each photovoltaic module 104 includes a photovoltaic panel (PV) 106 and a respective module output circuit 108 that is configured to control the output of the photovoltaic module in which it is located. Module output circuits 104 receive inputs from photovoltaic panels in their respective modules and provide outputs to a bus 110. A photovoltaic panel may also be referred to herein as a solar panel. Each module output circuit 108 converts DC voltage/current from one or more solar panels to a DC output voltage that is provided to bus 110. Module output circuits 108 include DC-to-DC conversion circuits that may include boost-buck circuits, buck-boost circuits, other switched-mode power circuits, or other types of DC-to-DC power control circuits, including linear power circuits. A DC-to-DC conversion circuit may be referred to as a power optimizer due to the control mechanisms the circuit provides to optimize the transfer of DC power from the DC source to the bus. Bus 110 provides a DC input to inverter 112, which generates an AC output. The AC output is then passed through a meter 114 to a power grid (e.g. commercial utility power grid) 120 for distribution to electrical consumers. The electrical consumers provide a load 122 for the electrical grid which may pass through a meter 116 and/or switch 118. In other examples, an inverter output may be used without going through a commercial grid (e.g. photovoltaic modules may provide power that is exclusively consumed at a single location, for example, the house or other building where the photovoltaic modules are located). Where the AC output is not supplied to a grid, a meter may be unnecessary and an inverter may directly supply AC power to a load. For example, in a domestic photovoltaic system, an inverter may provide an AC output that supplies power to the home. Examples below may be applicable to various power module configurations and are not limited to photovoltaic modules connected to a grid or any other specific configuration.

Figure 2:
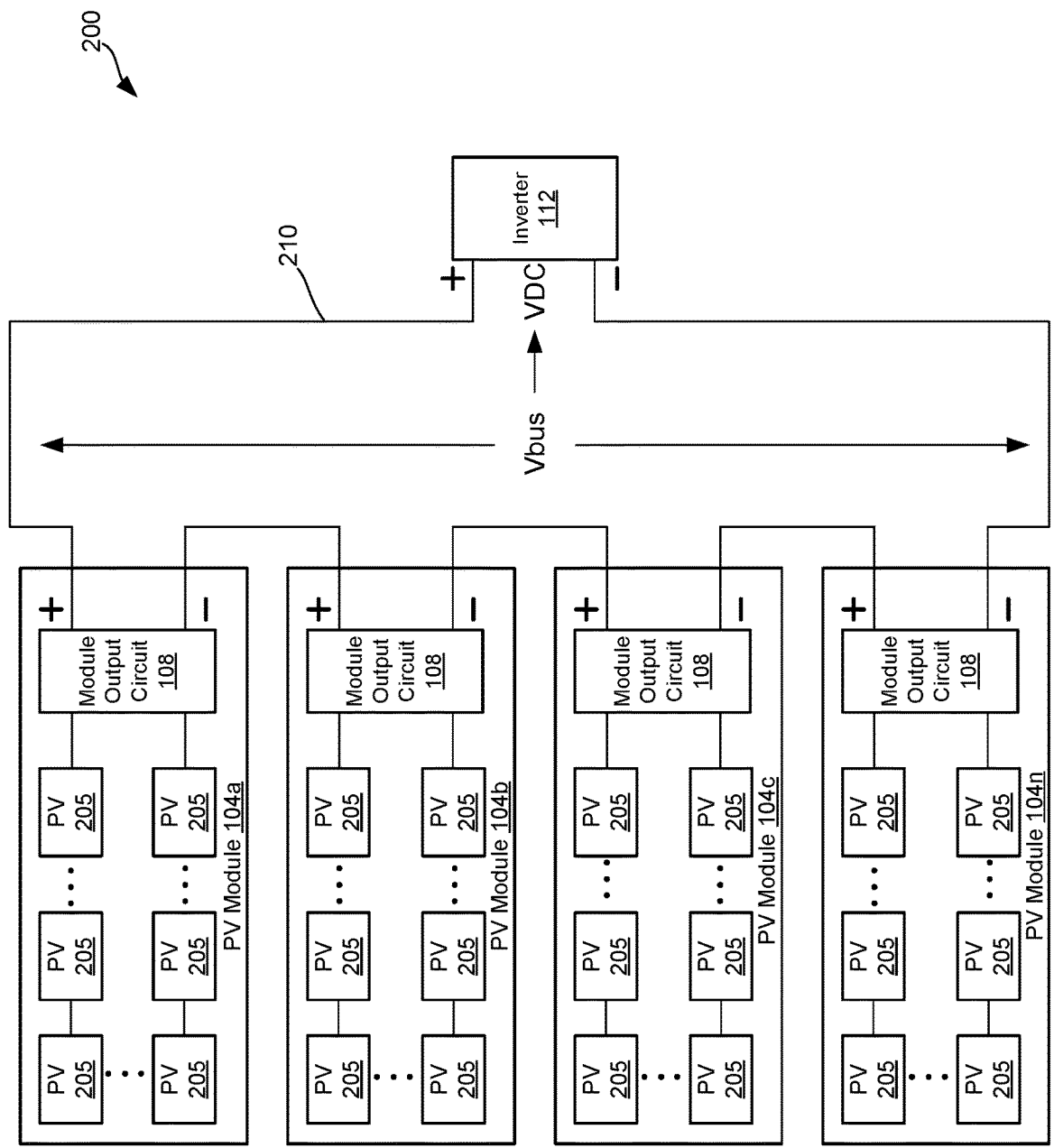
FIG. 2 is a block diagram depicting an example of a power system that includes a plurality of power modules having power cells connected in series.

FIG. 2 is a schematic illustration of a system 200 that includes photovoltaic modules 104 each having a respective module output circuit 108. It will be understood that the number of modules, n, may be any suitable number depending on a desired bus voltage and/or other factors. In a given photovoltaic module, photovoltaic cells ("PV Cell") are connected in series to provide an input to a module output circuit. For example, in each photovoltaic module 104, module output circuit 108 receives an input from series connected photovoltaic cells 205 and generates a DC output that is provided to bus 210.

In other systems, other types of power cells may be connected in series to form other power modules. For example, electrochemical cells may be similarly connected in series in an electrochemical power module or power storage module. Examples of power cells include photovoltaic cells and electrochemical cells. Photovoltaic cells convert photons into electricity. Photovoltaic cells may convert photons of various wavelengths including in the visible spectrum and near-visible spectrum (e.g. infra-red radiation).

Bus 210 is formed of conductors, for example, conductive metal wires that connect output terminals of photovoltaic modules. Bus 210 connects photovoltaic modules 104 in series so that the voltages are added together to produce a combined voltage that is the sum of their individual voltage outputs. Specifically, the outputs of the module output circuits in each PV module are connected in series. For example, the outputs of the power optimizers in each module output circuit may be connected in series. In FIG. 2, each photovoltaic module has a lower terminal that is negative ("−") and an upper terminal that is positive ("+") with the positive terminal of a lower photovoltaic module connected to the negative terminal of a neighboring photovoltaic module above it. For example, the positive terminal of photovoltaic module 104d is connected to the negative terminal of photovoltaic module 104b and the positive terminal of photovoltaic module 104b is connected to the negative terminal of photovoltaic module 104a. The positive terminal of photovoltaic module 104a is connected to a positive input terminal of inverter 112, while a negative terminal of photovoltaic module 104n is connected to a negative input terminal of inverter 112. Thus, inverter 112 receives an input that is the sum of all photovoltaic module outputs connected to bus 210 (minus any resistive loss). For example, if each photovoltaic module 104a-n provides an output voltage of 10 volts, then the combined output voltage supplied to inverter 112 by bus 210 would be 10×n.

In operation, the contributions of different photovoltaic modules 104a-n may vary for several reasons so that voltage, current, and power provided by individual photovoltaic modules 104a-n to bus 210 may vary and may cause the bus output voltage to inverter 112 to vary. For example, external conditions may cause changes in photovoltaic module outputs. Changing weather (including clouds) may affect different photovoltaic modules differently especially where photovoltaic modules are widely dispersed. Shadows may pass across various photovoltaic modules at various times causing individual photovoltaic modules to provide different outputs at different times. Photovoltaic modules may have different orientations causing them to have different efficiencies at different times of day. Internal factors may also affect photovoltaic modules in nonuniform ways. Photovoltaic modules may also provide different contributions because of factors that are internal to the individual photovoltaic modules. For example, photovoltaic modules may wear out at different rates so that some photovoltaic modules may be become less efficient than others over time and may be more limited in the voltage, current, and/or power that they contribute. New replacement photovoltaic modules may be more efficient than older photovoltaic modules. Internal faults may cause photovoltaic modules to provide reduced output either temporarily or permanently. Other factors may also cause variation in photovoltaic module output voltage, current, and/or power.

Figure 3B:
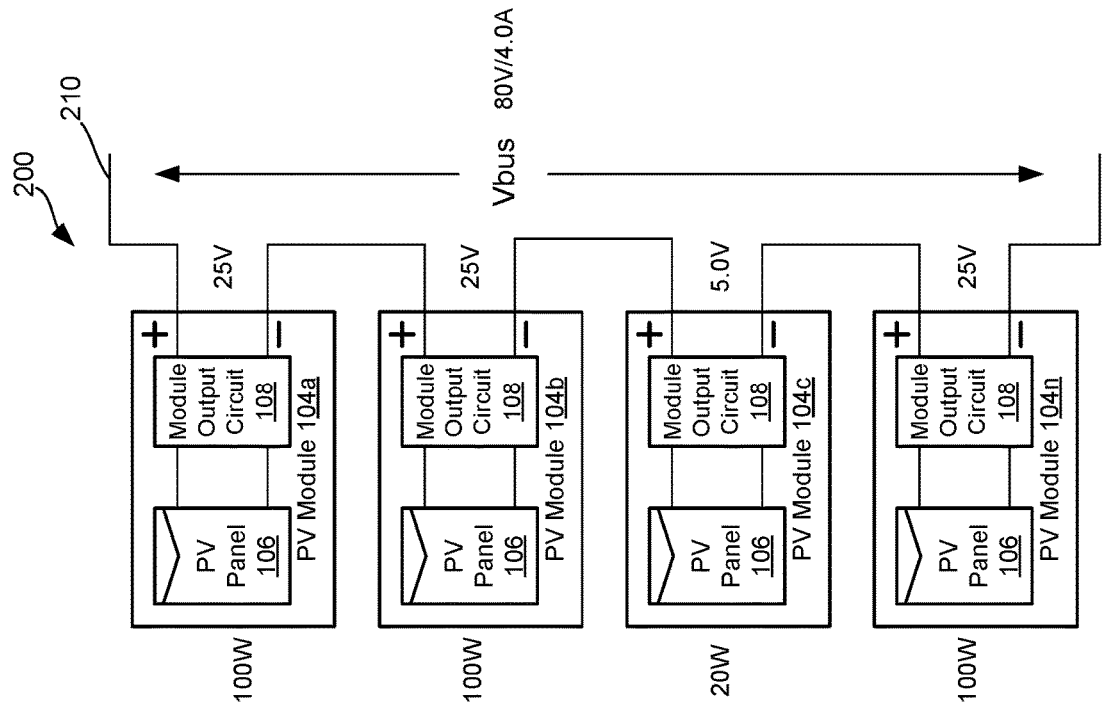
FIGS. 3A-3B are block diagrams depicting operation of a power system with multiple photovoltaic modules during different conditions.
Figure 3A:
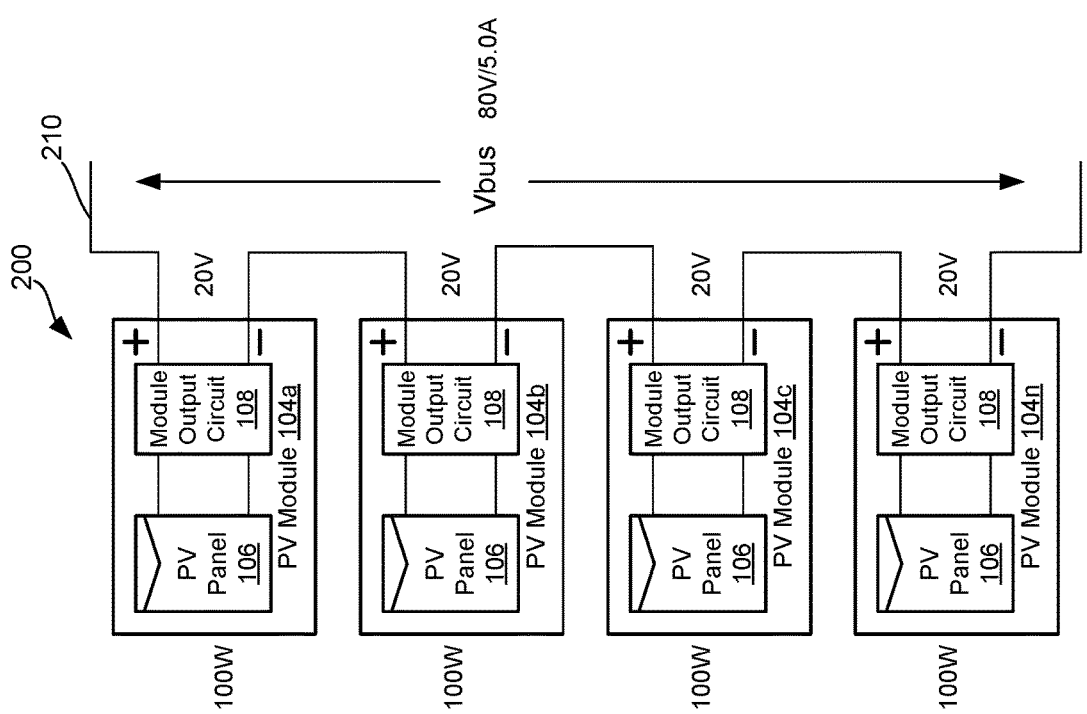

FIGS. 3A-3B illustrate how changing conditions may affect a photovoltaic system 300 in which outputs of multiple photovoltaic module output circuits 108 are connected in series by a bus 210. FIG. 3A shows a scenario where all outputs are equal, with each photovoltaic panel "PV" producing a hundred watts (100 W) of power and each module output circuits 108 providing this 100 W power at an output voltage of twenty volts (20 v) and a current of five amps (5.0 A) on bus 210. The combined output voltage Vbus of the power modules is 80V and the current through the modules and bus is 5.0 A.

FIG. 3B shows a scenario in which the power output of one photovoltaic panel is reduced to twenty watts (20 W). In this example, a cloud may be shadowing the photovoltaic panel in module 104c for example. However it will be understood than several different factors may cause one or more photovoltaic panels to produce lower than usual power. Module output circuit 108 at module 104c provides a reduced output voltage of four point five volts (5.0 v) and a current of four point five amps (4.0 A) as a result of the reduced power. Module output circuits at the other modules produce increased voltages of twenty-five volts (25 v) in this example (numbers are rounded off). In some cases, the photovoltaic module output voltages shown in FIG. 3B may maintain a bus output voltage to an inverter (not shown in FIG. 3B) within a specified range. In other cases, additional adjustment may be required to keep bus output voltage within a specified range. For example, with four modules connected to a bus in this scenario the output voltage remains (3×25)+5.0V=80V. Additional adjustment to output voltages of module output circuits may be desirable to bring an output voltage of bus 210 back to an acceptable range (e.g. back within a range of 75-85 v). If there are more modules, then this adjustment may be sufficient, i.e. if each unaffected module increases its output voltage by up to two volts (2 v) then in a system with eight or more unaffected modules, a drop of sixteen volts in an affected module may be made up by the unaffected modules.

Figure 4:
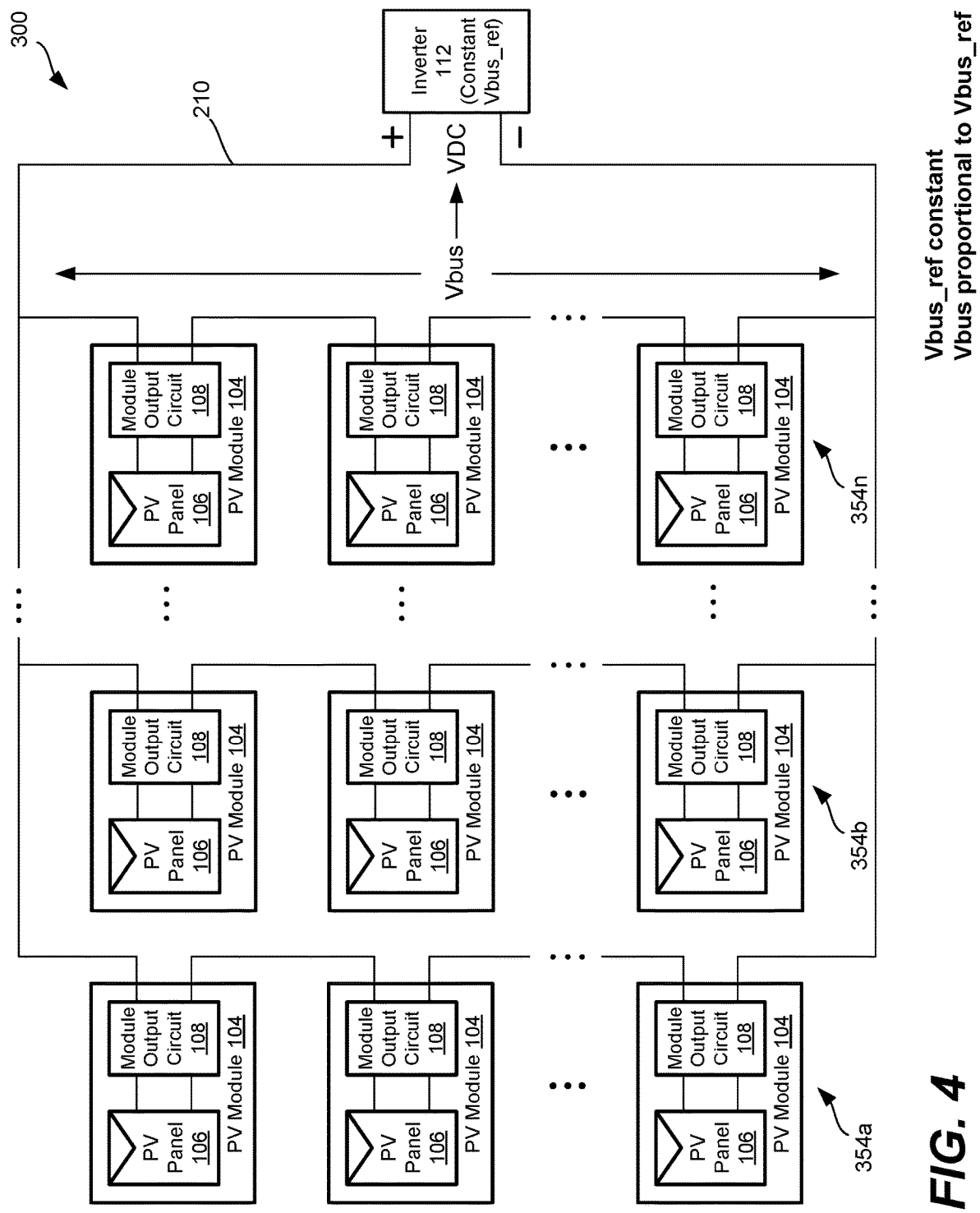
FIG. 4 is a block diagram depicting an example of power system operation by controlling an input bus voltage based on a constant reference voltage.

An inverter and/or a controller typically controls the DC power system to manage variations in the contributions of individual power modules. FIG. 4 is a block diagram of a power system depicting a plurality of strings 354a-n of PV modules and an inverter 112. The power modules within each string are connected in series as described in FIG. 2. The voltages of the modules within the strings are added to produce a combined voltage that is the sum of the modules within the string. The strings are connected in parallel so that the combined bus output voltage Vbus is equal to the voltage of an individual string.

In one example, inverter 112 controls a bus output of bus 210 within a specified range. For example, inverter 112 may provide a constant bus reference voltage that is used to regulate the bus output voltage. Inverter 112 controls the bus output voltage to follow or be in proportion to the bus reference voltage. In this manner, inverter 112 controls the input voltage by controlling the bus output voltage Vbus. By tracking the substantially constant bus reference voltage, the bus output voltage will be substantially constant. Various techniques may be used to control the combined bus output voltage. In one example, inverter 112 can modify an output current exported to an AC power grid. By varying the output current of the inverter, the bus voltage to the inverter can be regulated. In another example, inverter 112 can provide a control signal to the module output circuits 108 of each module. The module output circuits can control their individual output voltages to control the bus output voltage.

Figure 5:
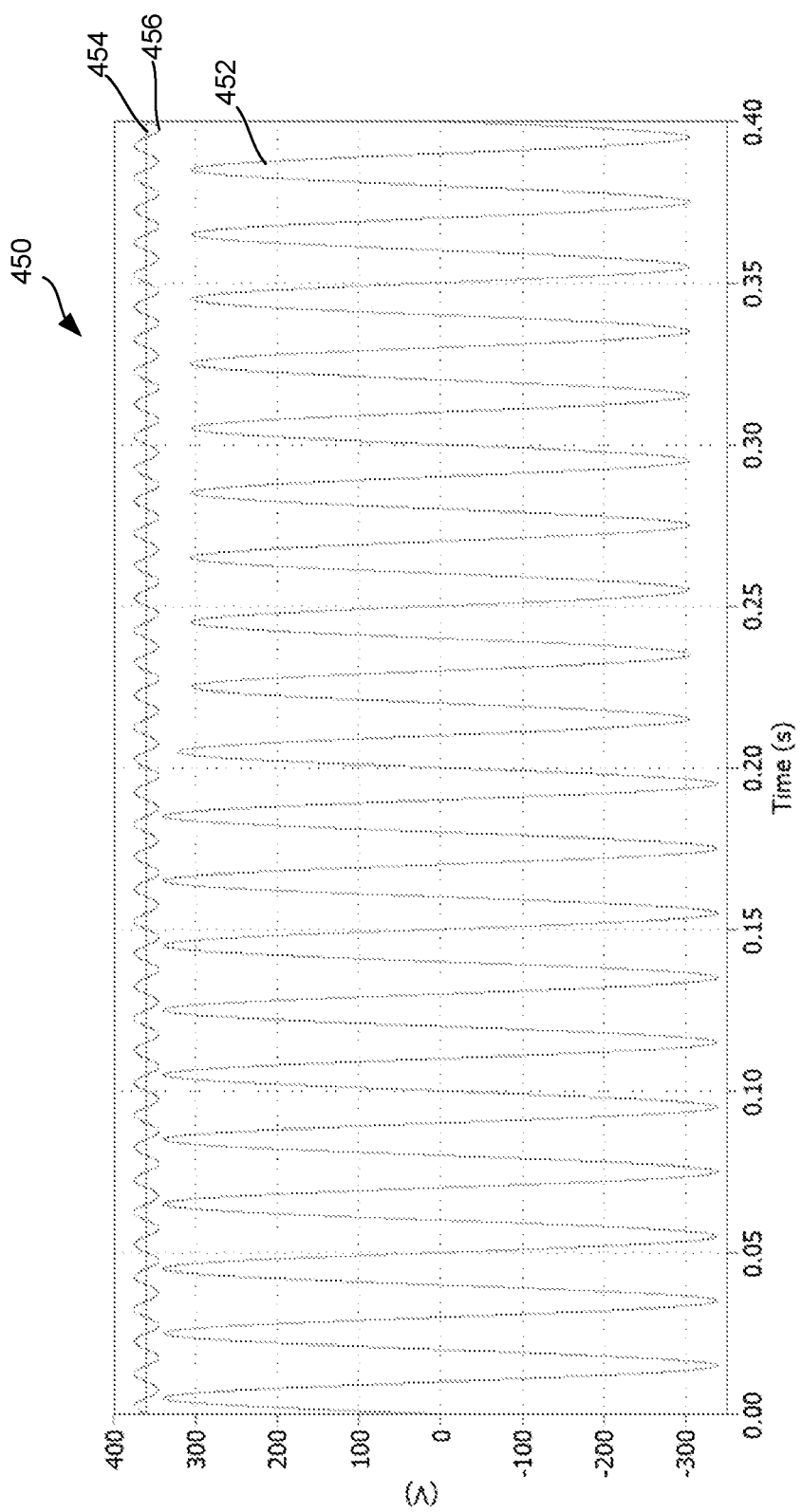
FIG. 5 is a graph depicting an alternating current (AC) output voltage, direct current input voltage, and constant reference voltage.

FIG. 5 depicts a graph 450 illustrating control of a DC bus voltage for an inverter exporting power to an AC power grid using a constant reference voltage. Line 452 depicts the alternating current (AC) voltage at the AC terminal of the inverter, equal to the voltage of an AC power grid for example. Line 454 depicts a reference voltage Vbus_ref for the bus coupled to the inverter. Line 456 depicts the DC voltage Vbus from the bus at the DC terminal of the inverter.

Line 452 illustrates an example of conditions where the voltage Vgrid of the power grid has a magnitude and amplitude that varies over time. Vgrid has a peak magnitude of about 350V at a first time at around 0.01 s. At time 0.35 s, however, the peak magnitude of the power grid voltage dips to about 300V.

Line 454 depicts a traditional reference voltage Vbus_ref that may be used to control the input bus voltage to the inverter. Vbus_ref has a constant voltage of about 350V throughout the time from 0.00 s to 0.40 s. A constant Vbus_ref is typically used so that the bus voltage Vbus of the combined output of the power modules remains constant over time. Individual power modules may adjust their output power, including voltage and/or current, to maintain a substantially constant Vbus as conditions vary.

Line 456 depicts the DC voltage Vbus that results from the reference voltage Vbus_ref. The voltage Vbus remains substantially constant by tracking the constant reference voltage. In this example, Vbus has an AC amplitude of about 20V, centered at 350V.

The ripple in the bus voltage Vbus is provided for exemplary purposes and may not be present in other examples, such as in a balanced three phase inverter system. In a single-phase inverter, for example, a large capacitor may be used to store power as part of converting between the DC power and AC power. The large capacitance may lead to a small sinusoidal ripple in the Vbus voltage as shown. In a three-phase inverter, however, a large capacitor may not be needed such that a substantial ripple is not present.

The use of a constant reference voltage Vbus_ref may result in an inefficient use of the combined DC voltage of the power modules. For example, when the grid voltage dips as shown in FIG. 5, the bus voltage Vbus remains the same. In this example, a 50V difference exists between the AC grid voltage peak magnitude and the level of the DC bus voltage Vbus. The difference in voltage can lead to poor utilization of the DC bus voltage. Specifically, the modulation index of the inverter is decreased as the power grid voltage Vgrid decreases relative to the input voltage Vbus, which may lead to lower efficiency of the inverter.

Figure 6:
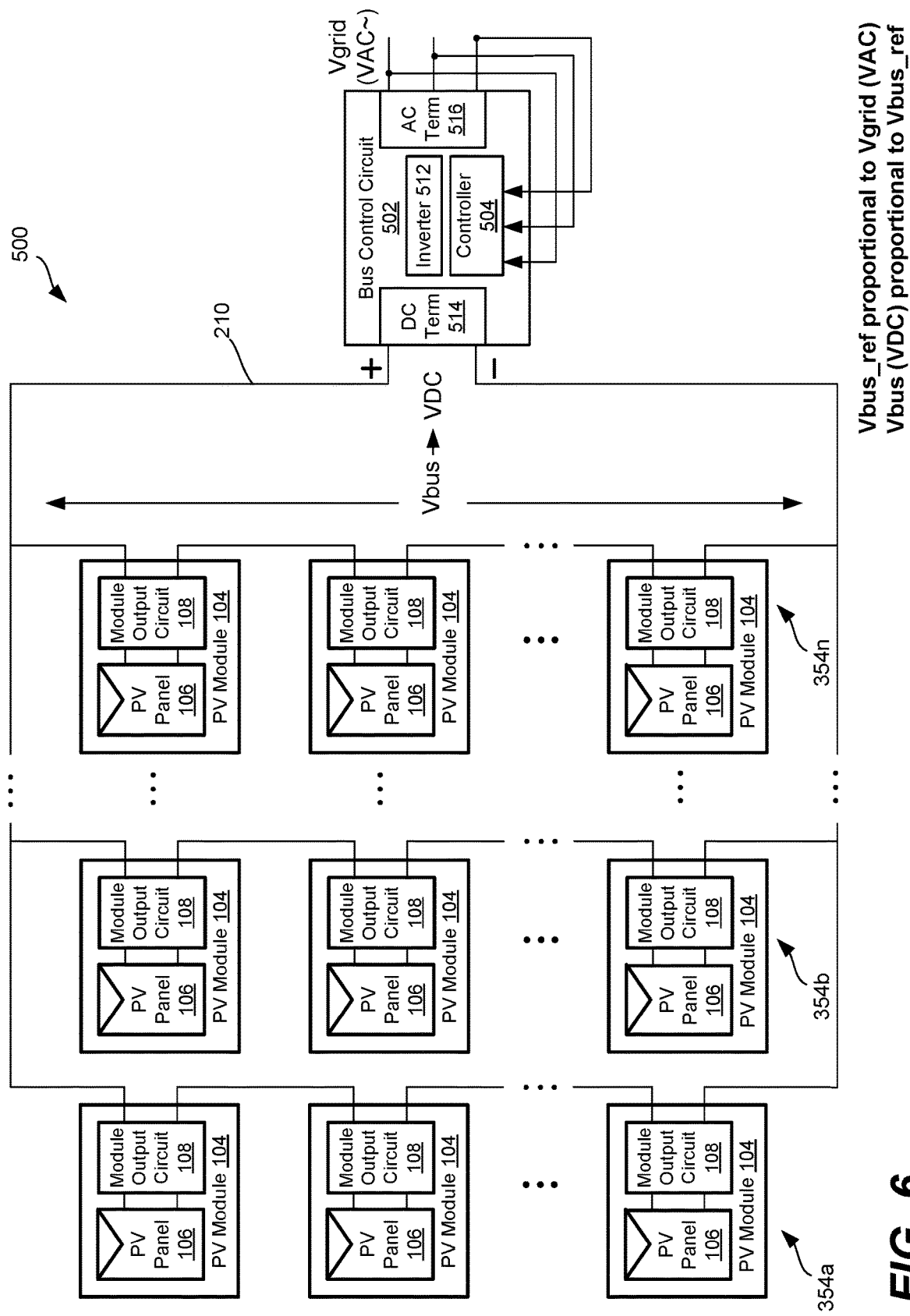
FIG. 6 is block diagram of a power system that provides control of an input bus voltage based on and output grid voltage in one embodiment.

FIG. 6 is a block diagram depicting a power system 500 in accordance with one embodiment that provides a variable DC bus voltage to track an AC voltage of a power grid. System 500 includes a plurality of strings 354a-354n of power modules as previously described. Any number of strings may be used, connecting individual power modules in series within a string and the strings in parallel.

A bus control circuit 502 is connected at a DC terminal to bus 210 which connects the outputs of the power modules within each string in series. Bus control circuit 502 includes a DC terminal 514 which connects to the bus and receives the combined output voltage Vbus. Bus control circuit 502 includes an AC terminal 516 which connects to a power grid having a voltage Vgrid. Bus control circuit 502 may include an inverter 512 and a controller 504 configured to control conversion of the input DC power to output AC power by the inverter.

In accordance with one embodiment, bus control circuit 502 includes a voltage controller 504 that is configured to control the voltage Vbus at the DC terminal of the bus control circuit based on the AC terminal voltage of the bus control circuit. Controller 504 detects the voltage Vgrid at the AC terminal of inverter 512 and controls the voltage Vbus based on the voltage Vgrid. In one embodiment, the controller generates a variable reference voltage Vbus_ref to have a voltage level that is based on the magnitude or amplitude of the voltage Vgrid. The reference voltage is substantially proportional to the voltage Vgrid. In this manner, the level of the reference voltage increases or decreases in proportion to increases and decreases in the AC terminal voltage. Controller 504 in turn controls Vbus based on the reference voltage Vbus_ref. Accordingly, the DC terminal voltage Vbus varies in proportion to changes in the AC terminal voltage Vgrid.

Controlling the voltage Vbus based on the voltage Vgrid can lead to increased efficiency in transferring power form the DC power modules to the AC power grid. The input voltage Vbus, corresponding to the combined output voltage of the power modules in a string, is tightly coupled to the power grid voltage Vgrid to maintain a high modulation index for power conversion. In this manner, losses in the inverter power conversion can be minimized.

In one embodiment, bus control circuit 502 includes an inverter 512 and controller 504 for controlling power conversion by the inverter. Controller 504 may include a processor, microprocessor, or multiple processing devices providing a control stage for the inverter. In one embodiment, controller 504 includes a voltage control circuit. Any one or any combination of bus control circuit 502, including inverter 110 and controller 504, and module output circuits 108 may be referred to as management circuitry. Management circuitry may also or alternatively refer to a controller external to bus control circuit 502 as hereinafter described. The management circuitry performs the functions described herein. The management circuitry may include a controller such as a microcontroller in one example. The controller may comprise a processor, ROM, RAM, and a memory interface. The storage devices (e.g., ROM, RAM) comprise code such as a set of instructions, and the processor is operable to execute the set of instructions to provide the functionality described herein. A memory interface in communication with storage devices and a processor is an electrical circuit that provides an electrical interface for a controller. Bus control circuit 502 is one example of a means for generating at an alternating current (AC) terminal an alternating current for a power grid, where the alternating current is generated based on the combined output voltage of a plurality of DC power modules.

Figure 7:
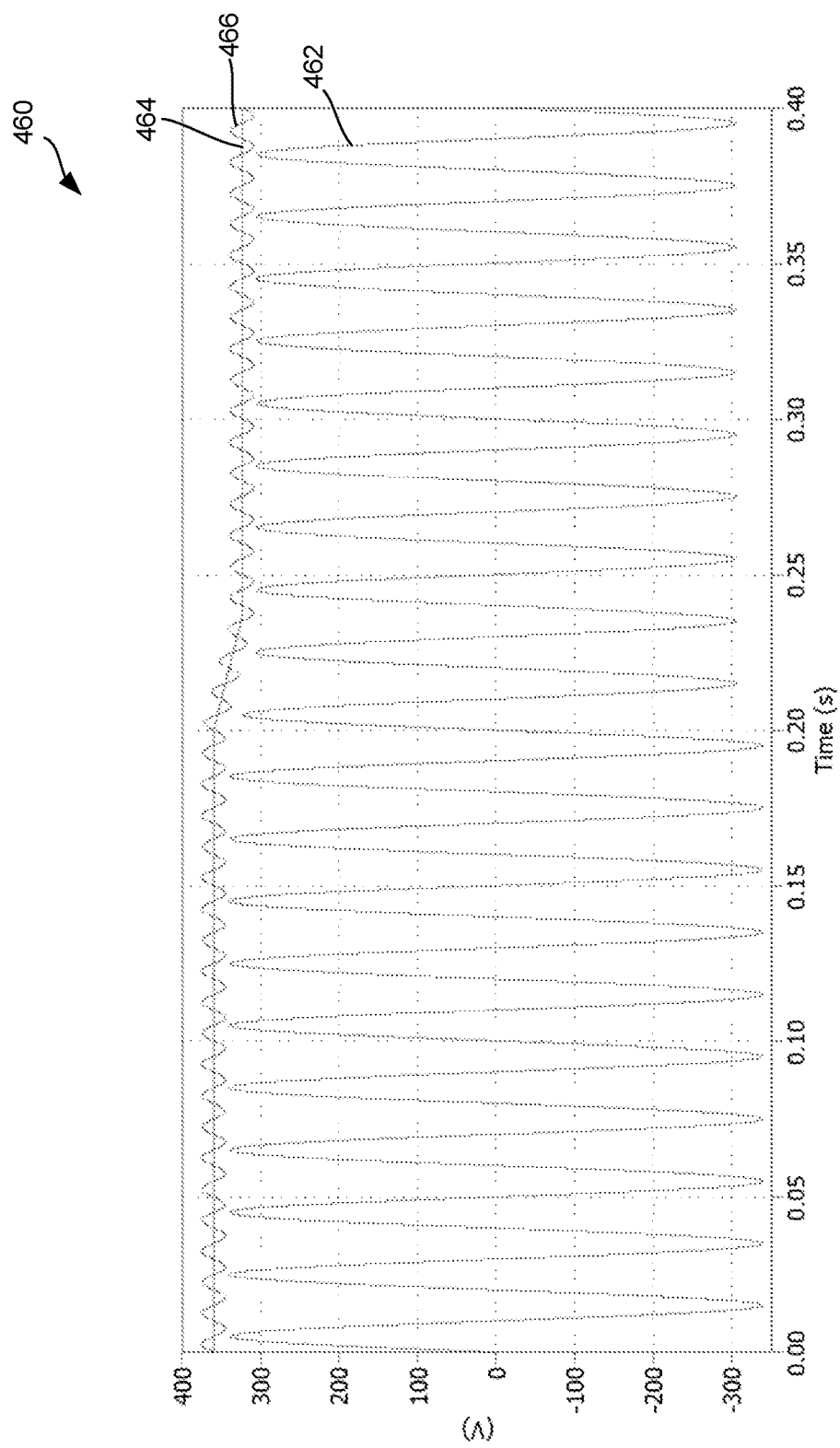
FIG. 7 is a graph depicting an alternating current (AC) output voltage, direct current input voltage, and variable reference voltage in one embodiment.

FIG. 7 depicts a graph 460 illustrating control of a DC voltage from a bus for a plurality of power modules based on an AC voltage of a power grid or other load. Line 462 depicts the alternating current (AC) voltage at the AC terminal of the inverter, equal to the voltage of the AC power grid. Line 464 depicts a reference voltage Vbus_ref for the bus coupled to the DC terminal of the inverter and line 466 depicts the bus voltage Vbus of the bus.

As earlier described, the peak magnitude of the power grid voltage falls by about 50V during the time period depicted in FIG. 7. Specifically, the peak magnitude falls from about 350V to about 300V over the time period between 0.175 s to 0.225 s as the amplitude decreases.

In order to maintain a high modulation index for DC to AC power conversion, a variable reference voltage Vbus_ref shown by line 466 is provided. As shown, the reference voltage is reduced beginning at 0.20 s. The reference voltage is about 350V at 0.20 s. The voltage is lowered to about 310V at 0.25 s. The reference voltage remains at 310V while the output voltage remains at 300V.

The resulting bus voltage Vbus that is provided to the DC terminal of the bus control circuit tracks the reference voltage Vbus_ref as shown by line 464. In this manner, the DC terminal voltage is tightly coupled to the AC voltage of the power grid. A large difference between the AC terminal voltage and the DC terminal voltage is avoided to maintain a high modulation index for power conversion.

Figure 8:
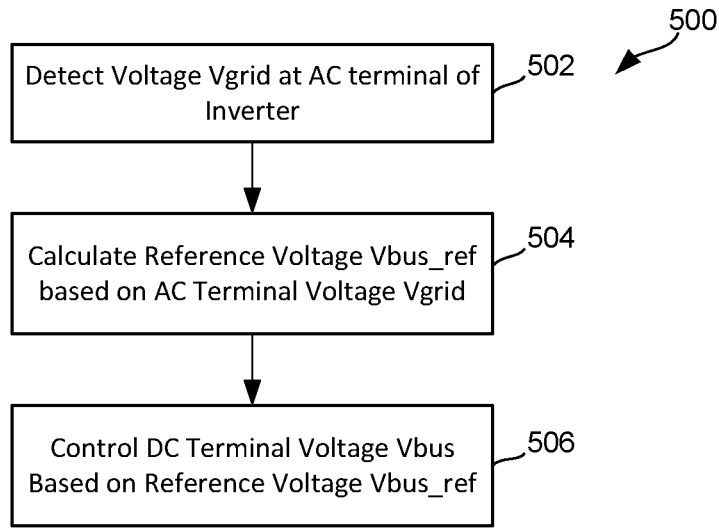
FIG. 8 is a flowchart describing a process for controlling an input bus voltage based on an output voltage in one embodiment.

FIG. 8 is a flowchart describing a process 500 of controlling DC power conversion to an AC power grid based on the amplitude of the AC voltage of the power grid. Process 500 may be practiced in the environment of FIG. 6 using a controller to control the DC voltage provided to bus control circuit 502, but is not limited to such an example of a power system environment. For example, process 500 may be practiced by a management circuit that is implemented separately from bus control circuit 502.

At step 502, the voltage Vgrid at the AC terminal of the bus control circuit 502 is detected. In one embodiment, a management circuit such as voltage controller 504 detects the voltage at the inverter of the bus control circuit. In another example, the management circuit may receive an indication of the grid voltage from a sensor, device, or other module. In yet another example, a management circuit may detect or receive an indication of the grid voltage at step 502. An indication of the grid voltage may be the grid voltage itself in one example. Step 502 may include determining the magnitude or amplitude of the AC voltage.

At step 504, a reference voltage Vbus_ref for the bus connecting the power modules is calculated based on the magnitude of the grid voltage Vgrid. The reference voltage is calculated by determining the peak amplitude of the grid voltage in one embodiment. Additionally, filtering and/or scaling of the grid voltage may be performed in order to determine a reference voltage suitable for a particular implementation. Calculating the reference voltage may comprise calculating a voltage level for the reference voltage.

At step 506, the voltage at the DC terminal of the bus control circuit is controlled based on the calculated reference voltage. Step 506 can include varying the input voltage Vbus from the bus based on the calculated reference voltage. Step 506 can include tightly coupling the input voltage Vbus to track the reference voltage Vbus_ref. In one example, step 506 includes attempting to reduce an error equal to the difference between the magnitude of Vbus and Vbus_ref. The level of the reference voltage Vbus_ref can be controlled to thereby control the level of the bus voltage Vbus. Step 506 may include controlling an alternating current provided from an inverter to a power grid in order to control the bus voltage Vbus at a DC terminal of the inverter.

Figure 9:
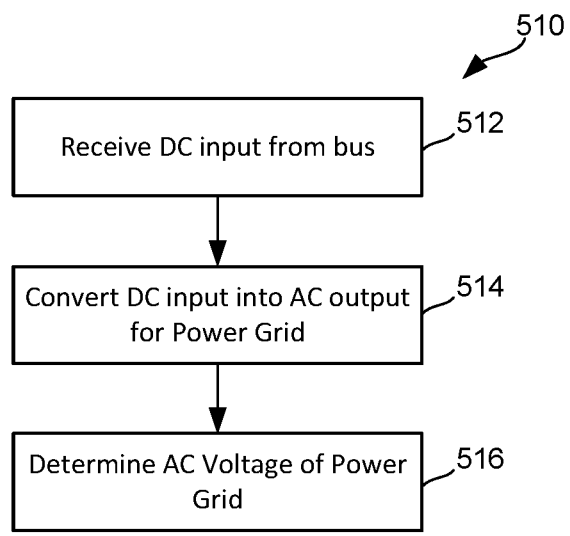
FIG. 9 is a flowchart describing a process for detecting an output voltage at a bus control circuit in one embodiment.

FIG. 9 is a flowchart describing a process 510 of detecting an alternating current voltage at an AC terminal for a bus control circuit having a direct current DC terminal coupled to a plurality of power modules. In one example, process 510 may be used at step 502 of FIG. 8. Process 510 describes determining the voltage at the AC terminal of an inverter coupled to a power grid. In one example, the AC terminal voltage is the grid voltage which can be detected as part of generating an AC current to be injected into the power grid. Process 510 may be practiced in the environment of FIG. 6 using a controller to control the voltage at the DC terminal of the bus control circuit 502, but is not limited to such an example of a power system environment. For example, process 510 may be practiced by a management circuit that is implemented separately from bus control circuit 502.

At step 514, a direct current input is received from a bus. In one example, the bus connects a plurality of power modules in series and provides a bus voltage Vbus equal to a sum of the output voltages produced by a group of series-connected power modules. The DC input is the combined output voltage Vbus in one embodiment. At step 514, the DC input is converted into an AC output for a power grid or other load. Standard voltage conversion can be used to by an inverter to generate from a direct current signal an alternating current signal having a sinusoidal shape.

At step 516, the voltage Vgrid at the AC terminal of the inverter is determined. In one embodiment, the peak amplitude of the AC voltage at the AC terminal of the inverter is determined at step 516. The AC voltage can be calculated or measured at step 516. In one embodiment, determining the peak amplitude comprises determining the peak magnitude of the absolute value of the AC voltage An absolute value of the AC terminal voltage can be taken, followed by determining the peak value of the absolute value. In one embodiment, step 516 includes generating an indication of the AC voltage. The indication can be used by controller 504 to generate a bus reference voltage. In another example, the indication can be used by a management circuit separate from the bus control circuit. The bus reference voltage may be used to generate a reference current. The reference current can be used to control the amount of current injected to the power grid by the inverter.

Figure 10:
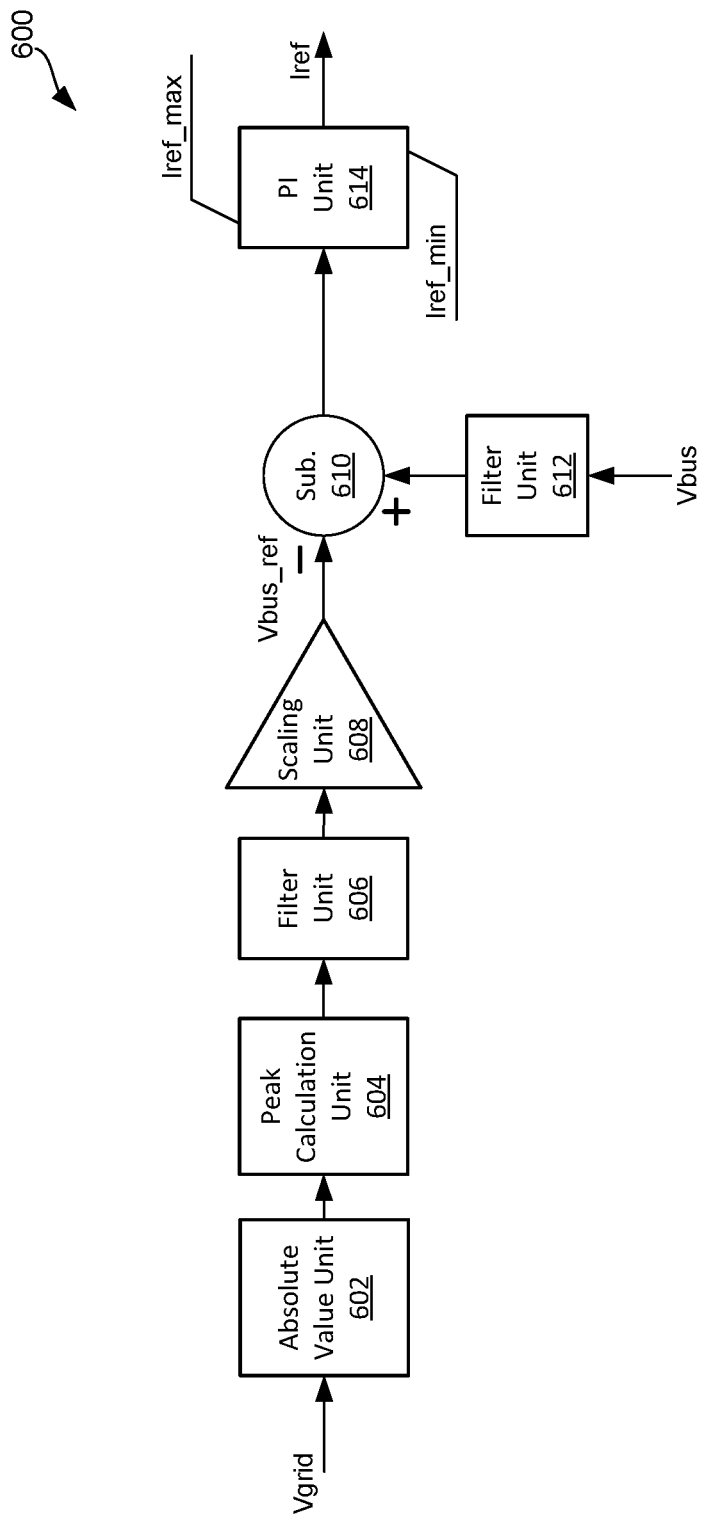
FIG. 10 is a block diagram of a controller configured to control an input bus voltage based on an output grid voltage in one embodiment.

FIG. 10 is a block diagram of a portion of a controller 600 in one embodiment. FIG. 10 is one example of a controller as shown in FIG. 6 that is used to control a DC bus input based on an AC output. Controller 600 can be implemented using hardware, software, and/or firmware.

Controller 600 receives the voltage Vgrid of the power grid at an AC terminal. An indication of the grid voltage or the actual grid voltage may be received. The grid voltage is passed to an absolute value unit 602 that determines an absolute value of the grid voltage. As shown in FIG. 6, for example, the grid voltage is an AC voltage having a sinusoidal shape that oscillates between positive and negative levels. The absolute value module provides an absolute value of the varying signal of the grid.

The absolute values are then passed through a peak calculation unit 604 that determines a peak amplitude or magnitude of the grid voltage. The peak amplitude is then passed through a filter unit 606. The filter unit 606 is a low-pass filter in one example that removes spikes or other extremes in the grid voltage magnitude. The filter unit can be used to control changes to the reference voltage by controller 600. Filtering can be used to slow the rate of change to the reference and input voltage, for example.

The filtered signal is then passed to a scaling unit 608. The scaling unit can be used to increase the value of the reference voltage over the level of the power grid. By scaling the grid voltage to calculate the reference voltage, over-modulation and/or other errors can be reduced or avoided. In one example, the scaling unit 608 provides a scaling factor of 1.05, but other factors may be used as suitable for a particular implementation.

The result of the scaling unit is a voltage level for the reference voltage Vbus_ref in this example. The reference voltage Vbus_ref is then used in additional stages to control the bus voltage Vbus by changing the output current provided to the power grid. The reference voltage is passed to a subtractor 610 or other combiner. The voltage Vbus at the DC terminal is received at a filter module 612. Filter module 612 can provide low pass filtering of the Vbus voltage, similar to filter module 606. The filtered Vbus voltage is then provided to the subtractor 610. Subtractor 610 combines the reference voltage Vbus_ref and the bus voltage Vbus to generate an error representing the difference between the values. In one example, subtractor 610 subtracts the level of the bus voltage from the level of the reference voltage to determine an amount of error.

The error resulting from the subtractor calculation is then passed to a proportional integral (PI) unit 614. PI unit 614 has the amount of error as an input and generates a reference current Iref based on the amount of error. In one embodiment, the PI unit generates a current reference Iref. The reference current Iref is the magnitude of the alternating current generated by the bus control circuit in one embodiment. The reference current is an amount of current targeted for injection into the power grid in one embodiment. PI unit 614 can control the reference current based on the error, which in turn will control the bus voltage Vbus. For example, if the error is a positive value indicating the level of the bus voltage Vbus is higher than the reference voltage Vbus_ref, Iref can be increased. By increasing the amount of output AC current generated by the bus control circuit, the amount of current drawn from the DC bus capacitor is increased, which results in a drop in Vbus. In one embodiment, PI unit 614 selects an amount of reference current Iref between a minimum reference current Iref_min and a maximum reference current Iref_max, to avoid an output current exceeding the capacity of the inverter. In one embodiment, PI module 614 provides proportional integral control to provide changes to the Iref current, thereby controlling the current drawn from the DC bus capacitor and the bus voltage. While proportional integral control is used in the example illustrated here, any suitable form of feedback control may be used.

Figure 11:
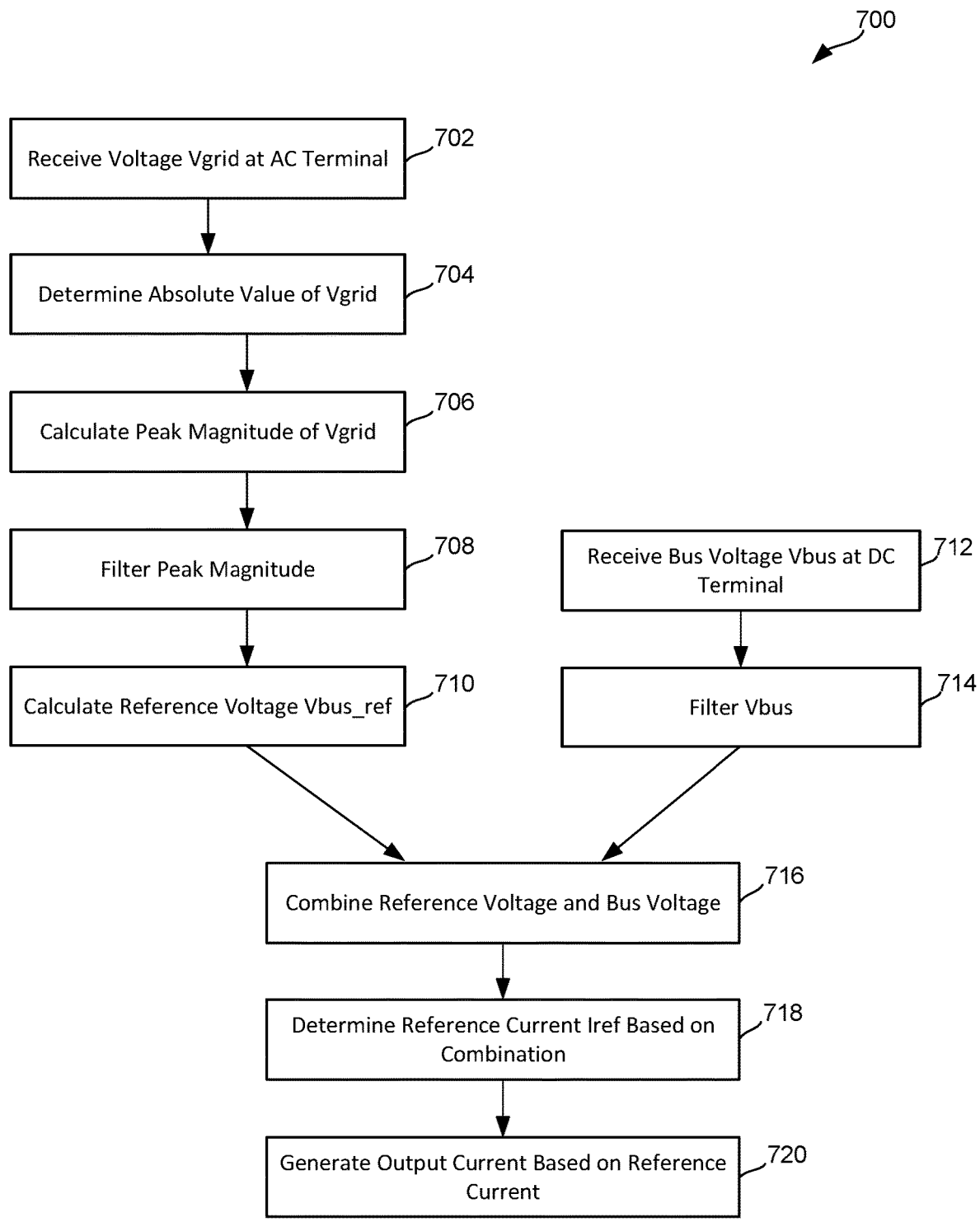
FIG. 11 is a flowchart describing a process for controlling an input bus voltage using a reference current in one embodiment.

FIG. 11 is a flowchart describing a process 700 of controlling a combined DC bus voltage Vbus from a plurality of power modules based on an AC voltage of a grid or other load. In one example, process 700 may be used at step 506 of FIG. 8. Process 700 describes a process of accessing an AC voltage at an AC terminal of an inverter, generating a reference bus voltage based on the AC voltage, and generating a DC bus voltage that tracks the reference bus voltage. Process 700 may be practiced in the environment of FIG. 6 using a voltage controller to control the DC input to bus control circuit 502, but is not limited to such an example of a power system environment. For example, process 700 may be practiced by a management circuit that is implemented separately from bus control circuit 502.

At step 702, an alternating current (AC) output voltage is received. In one example, an AC voltage Vgrid for a power grid or other load connected to a bus control circuit is received at step 702. In one embodiment, an indication of the AC voltage is received at step 702. The indicator can be the actual AC voltage or a representation of the voltage, such as a digital or analog representation of the AC voltage.

At step 704, an absolute value of the voltage Vgrid is determined. At step 706, a peak amplitude of the AC voltage is determined from the absolute value. In one embodiment, step 706 comprises determining a peak magnitude of the of the AC voltage. At step 708, the peak amplitude is filtered to by a low pass filter to remove spikes or other extremes in order to slow the rates of change to the reference and input voltage.

At step 710, the reference voltage Vbus_ref is calculated. The reference voltage is calculated by scaling the filtered output signal in one embodiment. The filtered voltage can be scaled (e.g., by a factor of 1.05) to increase the value of the reference voltage over the level of the power grid. The result of scaling is the reference voltage Vbus_ref In one embodiment, step 710 comprises determining a voltage level for the reference voltage Vbus_ref.

At step 712, the DC bus voltage Vbus is received. At step 714, the bus voltage Vbus is passed through a low pass filter. It is noted that steps 712 and 714 may be performed independently and without relation to the order of steps 702-710. For example, steps 702-710 are performed in parallel in one embodiment. At step 716, an error is calculated based on the reference voltage Vbus_ref and the input bus voltage Vbus. In embodiment, a subtractor is used to combine the reference voltage Vbus_ref and the bus voltage Vbus to generate an error representing the difference between the values.

At step 718, a reference current is determined based on the error between the voltages. A PI module uses the error along with other parameters to generate a reference current in one embodiment using proportional integral control. An amount of reference current is determined in one embodiment.

At step 720, the output AC current is generated based on the reference current at step 718. In one embodiment, the inverter provides an amount or level of output current that is proportional to the amount or level of the reference current generated in step 718. By controlling the reference current, the bus voltage Vbus is controlled. The amount of reference current can be increased, thereby increasing the amount of output current exported to the AC grid. By increasing the amount of current output to the AC grid, the level of the bus voltage will be decreased. If the reference current is decreased, the output current exported to the grid is decreased. By decreasing the current output to the AC grid, the bus voltage will be increased.

Figure 12:
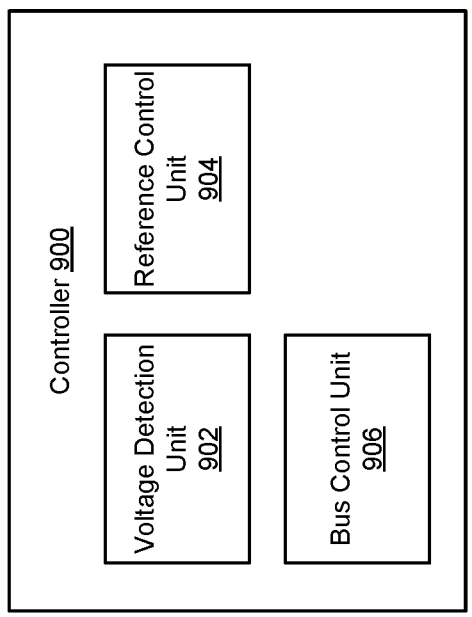
FIG. 12 is a block diagram of a controller in one embodiment.

FIG. 12 is a block diagram of one embodiment of an apparatus 900 for controlling a combined output voltage from a plurality of power modules to a DC terminal of an inverter based on an AC voltage of a power grid coupled to an AC terminal of the inverter. In one embodiment, the apparatus 900 may include a controller 504 as shown in FIG. 6. The apparatus 900 may also include a stand-alone controller or other computing device as described above. In certain embodiments, processes 500, 510, and 700 may be performed based on apparatus 900. The apparatus includes a voltage detection unit 902, reference control unit 904, and bus control unit 906. The various units could be implemented with any combination of hardware and/or software.

In general, the voltage detection unit 902 is configured to determine an AC voltage of a power grid. In one embodiment, the AC voltage of the power grid is a voltage at an AC terminal of an inverter or other voltage converter connected to a plurality of DC power modules. Unit 902 can be configured to determine an AC voltage of the AC terminal which is coupled to the power grid. Voltage detection unit 902 is one example of a voltage detection means for determining or detecting an AC voltage at an AC terminal of an inverter coupled to an AC power grid. Voltage detection unit 902 is one example of a means for receiving a DC voltage and current from a bus connecting the outputs of a plurality of power modules. Voltage detection unit 902 is one example of a means receiving at a direct current (DC) terminal a combined output voltage of a plurality of DC power modules connected in series. Voltage detection unit is one example of a means for detecting at an AC terminal an AC voltage having a variable amplitude.

The reference control unit 904 is configured to generate one or more reference signals for controlling a DC bus coupled to a DC terminal of an inverter. Reference control unit 904 can be configured to generate a reference voltage for controlling a bus voltage or a reference current for controlling the bus voltage. Reference control unit 904 may alternately or additionally generate one or more indications of a reference voltage or current. Reference control unit 904 may control a voltage level of a reference voltage or an amount of reference current. Reference control unit 904 is one example of a reference control means for providing a reference DC voltage for a bus connecting the outputs of a plurality of power modules in series. Reference control unit 904 is one example of a means for generating a variable reference voltage to control a DC input from a bus based on an amplitude of an AC voltage. Reference control unit 904 is one example of a means for generating a variable reference current to control a DC voltage of a bus. Reference control unit 904 is one example of a means for determining a DC reference voltage based on an AC voltage of a power grid and generating one or more indications of the DC reference voltage.

The bus control unit 906 is configured to control a DC bus voltage provided to the DC terminal of an inverter from a plurality of power modules based on an AC voltage of the power grid. The bus control unit 906 is configured to control a bus voltage based on an AC voltage in one example. The bus control unit 906 controls the bus voltage based on a reference voltage or current that tracks an AC voltage of the power grid. Bus control unit 906 is one example of a means for controlling a DC voltage based on a reference DC voltage that varies with an AC voltage. Input control unit 906 is one example of a means for controlling a DC voltage from a bus based on a variable peak magnitude of an AC voltage of a power grid.

The units of FIG. 12 may include or be formed as part of any suitable processing device. The units of FIG. 12 may include or be formed as part of an inverter or bus control circuit 502. In some example embodiments, the apparatus 900 may further include one or more elements for performing any one or combination of steps described in the embodiments. In accordance with various embodiments of the present disclosure, the methods described herein may be implemented using a hardware computer system that executes software programs.

Figure 13:
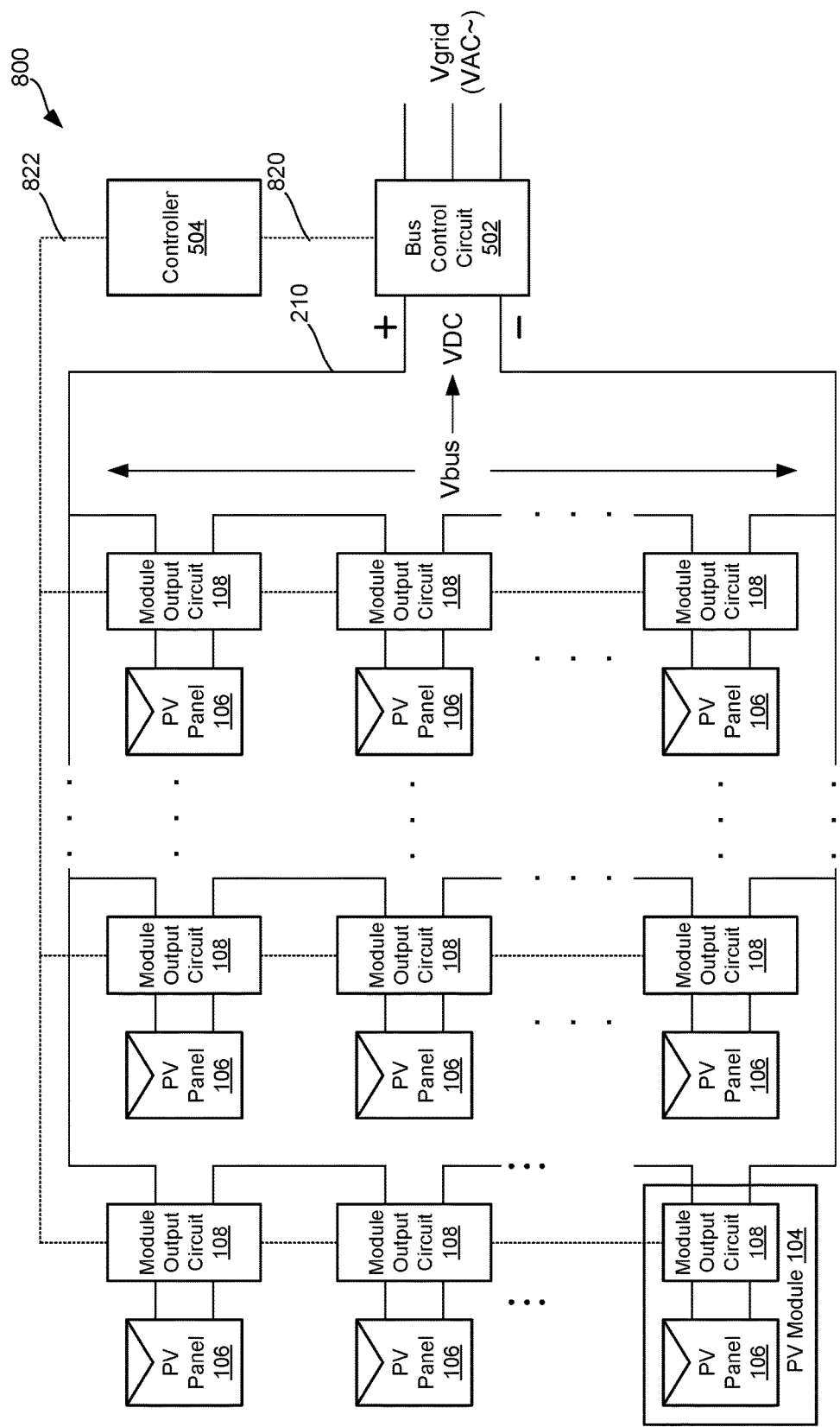
FIG. 13 is block diagram of a power system including a controller implemented separately from a bus control circuit in one embodiment.

FIG. 13 is a block diagram depicting a power system 800 in accordance with one embodiment. System 800 includes a plurality of strings 354a-354n of power modules as previously described in FIG. 6. A bus control circuit 502 is connected to bus 210 which connects the outputs of the power modules within each string in series. As earlier described, bus control circuit 502 receives the combined output voltage Vbus at a DC terminal and generates an output AC current that is provided to a power grid having a voltage Vgrid. Bus control circuit 502 may include an inverter and a controller configured to control conversion of the input DC power to an output AC power.

In accordance with the embodiment shown in FIG. 13, controller 504 is implemented separately from bus control circuit 502. Controller 504 may be implemented as an independent circuit in one embodiment. In one example, controller 354 is implemented as a stand-alone controller such as by a processor or microcontroller. Controller 504 may generate indications of the AC voltage of the grid, DC voltage of the bus, reference voltage, and/or reference current. In one embodiment, the indications are the actual voltages and/or currents. In other examples, the indications are representations of the actual voltages and currents.

A communication bus 820 connects controller 504 with bus control circuit 820. Controller 504 may provide an indicator of a reference current or voltage to bus control circuit to be used in controlling the bus voltage. In another example, controller 504 may provide an indication of the reference voltage directly to the bus control circuit. The bus control circuit can then control the bus voltage.

A communication bus 822 connects controller 504 with module output circuits 108. In one embodiment, controller 504 may control module output circuits 108 in order to coordinate outputs provided to bus 210 so that a bus output provided to inverter 512 may be maintained within a specified range. Controller 504 can be connected to module output circuits 104 to control respective outputs of the module output circuits. The controller may control these outputs based on a variety of factors including voltage, current, or other measured values at one or more points in photovoltaic system 200. A controller may provide inputs to particular module output circuits to cause them to change their outputs in specified ways. For example, a controller may command a module output circuit to increase its output voltage or current. In some examples, a module output circuit may include a switched-mode power circuit and a controller may command a module output circuit to operate such a switched-mode power circuit at a particular modulation index, which may provide a specific output.

In one embodiment, controller 504 includes a communication bus 820 to bus control circuit 502 but not the module output circuits 108. In another embodiment, controller 504 includes a communication bus 822 to module output circuits 108, but not the bus control circuit 502.

Figure 14:
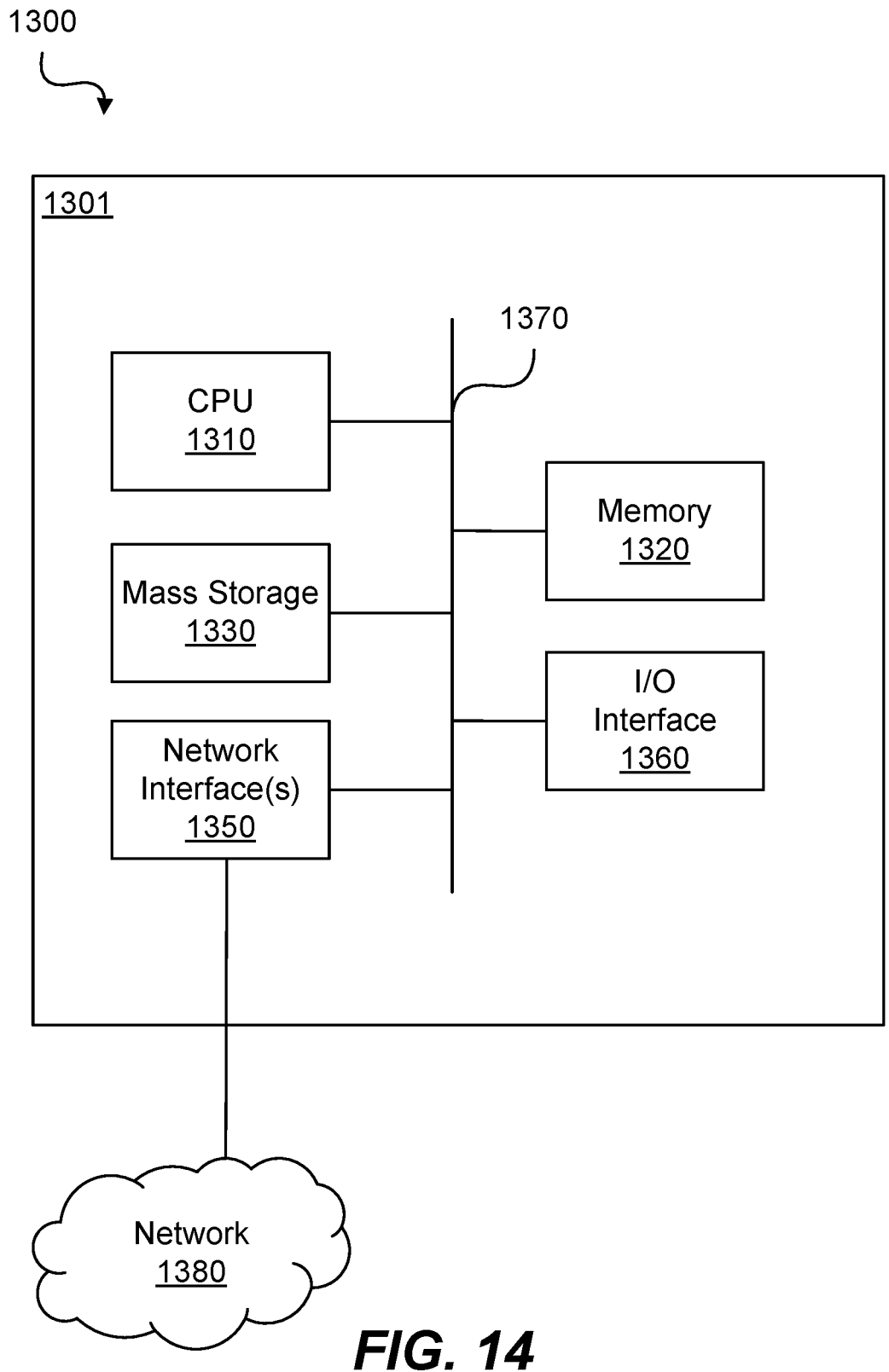
FIG. 14 is a block diagram of a computing system such as a controller.

FIG. 14 is a high level block diagram of a computing system 1300 that can be used to implement various embodiments. In one example, computing system 1300 is an inverter or bus control circuit. Specific devices may utilize all of the components shown, or only a subset of the components, and levels of integration may vary from device to device. Furthermore, a device may contain multiple instances of a component, such as multiple processing units, processors, memories, transmitters, receivers, etc.

The computing system may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus. The bus may be one or more of any type of several bus architectures including a memory bus or memory controller, a peripheral bus or the like. Processing unit 1301 may be used to implement any of the computing devices described herein, such as remote devices 160, and/or hosts 112.

The CPU 1310 may comprise any type of electronic data processor. The CPU 1310 may be configured to implement any of the schemes described herein, such as the processes illustrated in FIGS. 8, 9, and 11 using any one or combination of steps described in the embodiments. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the network 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like. In one embodiment, the network interface 1350 may be used to receive and/or transmit interest packets and/or data packets in an ICN. Herein, the term "network interface" will be understood to include a port.

The components depicted in the computing system of FIG. 14 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

A computer-readable non-transitory media includes all types of computer readable media, including magnetic storage media, optical storage media, and solid state storage media and specifically excludes signals. It should be understood that the software can be installed in and sold with a device. Alternatively the software can be obtained and loaded into a device, including obtaining the software via a disc medium or from any manner of network or distribution system, including, for example, from a server owned by the software creator or from a server not owned but used by the software creator. The software can be stored on a server for distribution over the Internet, for example.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

What is claimed is:

1. An apparatus, comprising:
a converter having a direct current (DC) input terminal and an alternating current (AC) output terminal; and
a management circuit configured to determine an AC voltage at the AC terminal and control a direct current (DC) voltage at the DC terminal based on the AC voltage by varying an amount of current provided to the AC terminal based on the AC voltage to maintain a modulation index of the converter.

2. The apparatus of claim 1, wherein:
the management circuit is configured to generate a DC reference voltage based on the AC voltage; and
the management circuit is configured to control the DC voltage based on the DC reference voltage.

3. The apparatus of claim 2, wherein:
the management circuit is configured to provide the DC voltage at a first voltage level in response to a first magnitude of the AC voltage and to provide the DC voltage at a second voltage level in response to a second magnitude of the AC voltage;
the first voltage level of the DC voltage is higher than the second voltage level of the DC voltage; and the first magnitude of the AC voltage is higher than the second magnitude of the AC voltage.

4. The apparatus of claim 3, wherein:
the management circuit is configured to detect the first magnitude and the second magnitude of the AC voltage at the AC terminal.

5. The apparatus of claim 1 wherein the DC input terminal is coupled to a plurality of power modules via a bus, the plurality of power modules comprising a plurality of photovoltaic power modules, each power module of the plurality having a plurality of photovoltaic cells.

6. The apparatus of claim 5, wherein:
the management circuit includes a controller coupled to the bus;
the controller is configured to generate a reference voltage at a first reference level by filtering based on a first magnitude of the AC voltage and a second reference level by filtering based on a second magnitude of the AC voltage; and
the controller is configured to determine a first amount of a reference current based on combining the first reference level and the first voltage level and is configured to determine a second amount of the reference current based on combining the second reference level and the second voltage level.

7. The apparatus of claim 6, wherein:
the converter comprises an inverter;
the DC input terminal of the inverter is connected to the bus and is configured to receive the DC voltage; and
the AC output terminal of the inverter is connected to a power grid that provides the AC voltage.

8. A method, comprising:
receiving at a direct current (DC) terminal a DC voltage;
generating at an alternating current (AC) terminal an alternating current, the alternating current is generated based on the DC voltage;
detecting at the AC terminal an AC voltage having a variable amplitude; and
controlling the DC voltage based on the AC voltage amplitude by varying an amount of current provided to the AC terminal based on the AC voltage to maintain a modulation index of the converter.

9. The method of claim 8 further including generating a variable DC reference voltage to control a level of the DC voltage based on the variable amplitude of the AC voltage, and
controlling the DC voltage based on the variable DC reference voltage.

10. The method of claim 9, wherein generating a variable reference voltage comprises:
generating the variable reference voltage at a first reference level based on a first amplitude of the AC voltage; and
generating the variable reference voltage at a second reference level based on a second amplitude of the AC voltage;
wherein the first amplitude is greater than the second amplitude; and
wherein the first reference level of the variable reference voltage is higher than the second reference level of the variable reference voltage.

11. The method of claim 10, further comprising:
generating the DC voltage at a first voltage level in response to the first reference level of the variable reference voltage; and
generating the DC voltage at a second voltage level in response to the second reference level of the variable reference voltage;
wherein the first voltage level of the DC voltage is greater than the second voltage level of the DC voltage.

12. The method of claim 11, further comprising:
generating a variable reference for an output current output to the AC terminal based on the variable amplitude of the AC voltage.

13. The method of claim 12, wherein:
the DC voltage received at the DC terminal comprises a combined output voltage of a plurality of power modules equal to a sum of individual DC output voltages of the plurality of power modules.

14. The method of claim 13, wherein:
the plurality of power modules is a plurality of photovoltaic power modules; and
each power module includes a power optimizer and a photovoltaic panel having a plurality of photovoltaic cells.

15. The method of claim 13, wherein:
the variable amplitude is a variable peak amplitude of the AC voltage.

16. A non-transitory computer-readable medium storing computer instructions for controlling a direct current (DC) source, that when executed by one or more processors, cause the one or more processors to perform the steps of:
detecting an alternating current (AC) voltage at an AC terminal of an inverter; and
controlling the DC source to provide a DC voltage based on a magnitude of the AC voltage by varying an amount of current provided to the AC terminal based on the AC voltage to maintain a modulation index of the converter.

17. The non-transitory computer-readable medium of claim 16, wherein the instructions when executed by one or more processors, cause the one or more processors to:
determine for the DC source connected to a DC terminal of the inverter a DC reference voltage based on the AC voltage at the AC terminal; and
generate one or more indications of the DC reference voltage in order to provide a DC source voltage at a voltage level based on a magnitude of the AC voltage at the AC terminal of the inverter.

18. The non-transitory computer-readable medium of claim 17, wherein:
the instructions when executed by one or more processors, cause the one or more processors to detect an AC voltage at a first magnitude of the AC voltage and a second magnitude of the AC voltage at the AC terminal of the inverter, the first magnitude is greater than the second magnitude;
the instructions when executed by one or more processors, cause the one or more processors to determine a first reference level for the reference voltage and a second reference level for the DC reference voltage based on the first magnitude of the AC voltage and the second magnitude of the AC voltage, the first reference level is greater than the second reference level; and
the instructions when executed by one or more processors, cause the one or more processors to generate a first indication of the first reference level of the reference voltage to provide DC source voltage at a first DC voltage level and generating a second indication of the second reference level of the reference voltage to provide the DC source voltage at a second DC voltage level, the first DC voltage level is greater than the second DC voltage level.

19. The non-transitory computer-readable medium of claim 17, wherein the instructions when executed by one or more processors, cause the one or more processors to:
generate a first current reference based on the indication of a reference level of the DC reference voltage;
generate a second current reference based on the indication of a second reference level of the DC reference voltage; and
generate the DC Source voltage at the first DC voltage level by providing to the DC source a first amount of AC output current based on the first current reference and generating the DC voltage at the second DC voltage level by providing to the DC source a second amount of AC output current based on the second current reference;
wherein the first amount of AC output current is less than the second amount of AC output current.

* * * * *

UNITED STATES PATENT AND TRADEMARK OFFICE
CERTIFICATE OF CORRECTION

PATENT NO. : 12,062,918 B2
APPLICATION NO. : 17/880497
DATED : August 13, 2024
INVENTOR(S) : Xiaolin Mao et al.

Page 1 of 1

It is certified that error appears in the above-identified patent and that said Letters Patent is hereby corrected as shown below:

In the Claims

• Column 21, Line 12 (Claim 19, Line 9): please replace "DC Source" with --DC source--

Signed and Sealed this
Fourth Day of March, 2025

Coke Morgan Stewart
*Acting Director of the United States Patent and Trademark Office*